United States Patent
Pradas et al.

(10) Patent No.: US 12,369,214 B2
(45) Date of Patent: Jul. 22, 2025

(54) METHODS FOR CONTROLLING RE-ESTABLISHMENT OF IAB NODES

(71) Applicant: Telefonaktiebolaget LM Ericsson (publ), Stockholm (SE)

(72) Inventors: Jose Luis Pradas, Stockholm (SE); Oumer Teyeb, Montréal (CA); Ajmal Muhammad, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 350 days.

(21) Appl. No.: 17/776,069

(22) PCT Filed: Nov. 13, 2020

(86) PCT No.: PCT/EP2020/081992
§ 371 (c)(1),
(2) Date: May 11, 2022

(87) PCT Pub. No.: WO2021/094502
PCT Pub. Date: May 20, 2021

(65) Prior Publication Data
US 2022/0394797 A1    Dec. 8, 2022

Related U.S. Application Data

(60) Provisional application No. 62/935,472, filed on Nov. 14, 2019.

(51) Int. Cl.
*H04W 76/18* (2018.01)
*H04W 76/19* (2018.01)
*H04W 76/30* (2018.01)

(52) U.S. Cl.
CPC ............ *H04W 76/18* (2018.02); *H04W 76/19* (2018.02); *H04W 76/30* (2018.02)

(58) Field of Classification Search
CPC ...... H04W 76/19; H04W 76/18; H04W 76/30; H04W 88/085; H04W 92/20
See application file for complete search history.

(56) References Cited

U.S. PATENT DOCUMENTS

| | | | |
|---|---|---|---|
| 2020/0007223 A1* | 1/2020 | Zhu | H04W 16/26 |
| 2022/0039188 A1* | 2/2022 | Ishii | H04W 76/19 |
| 2022/0053588 A1* | 2/2022 | Shaheen | H04W 40/22 |

OTHER PUBLICATIONS

International Search Report and Written Opinion dated Feb. 15, 2021 for International Application No. PCT/EP2020/081992 filed Nov. 13, 2020; consisting of 16 pages.
(Continued)

*Primary Examiner* — Mansour Oveissi
(74) *Attorney, Agent, or Firm* — Weisberg I.P.Law, P.A.

(57) ABSTRACT

A method, system and apparatus for controlling reestablishment of integrated access and backhaul (IAB) nodes are disclosed. According to one or more embodiments, a first integrated access and backhaul (IAB) node is provided. The first IAB node includes processing circuitry configured to, responsive to receiving a radio link failure, RLF, indication from a second IAB node, consider at least the second IAB node to be at least temporarily unsuitable for camping on a cell of the second IAB node. The processing circuitry further configured to, responsive to the second IAB node being considered to be at least temporarily unsuitable for camping, cease to camp on the second IAB node for connection reestablishment.

19 Claims, 11 Drawing Sheets

BEGIN

Responsive to receiving a radio link failure, RLF, indication from a second IAB node, consider at least the second IAB node to be at least temporarily unsuitable for camping on a cell of the second IAB node
S138

Responsive to the second IAB node being considered to be at least temporarily unsuitable for camping, cease to camp on the second IAB node for connection reestablishment
S140

END

(56) References Cited

OTHER PUBLICATIONS

3GPP TR 38.874 V16.0.0; 3rd Generation Partnership Project; Technical Specification Group Radio Access Network; NR; Study on Integrated Access and Backhaul; (Release 16); Dec. 2018; consisting of 111 pages.

3GPP TS 38.304 V15.5.0; 3rd Generation Partnership Project; Technical Specification Group Radio Access Network; NR; User Equipment (UE) procedures in Idle mode and RRC Inactive state (Release 15); Sep. 2019; consisting of 29 pages.

3GPP TS 38.331 V15.7.0; 3rd Generation Partnership Project; Technical Specification Group Radio Access Network; NR; Radio Resource Control (RRC) protocol specification (Release 15); Sep. 2019; consisting of 527 pages.

3GPP TSG-RAN WG2 Meeting #106 R2-1906071, Revision of R2-1904978; Title: Cell Selection and Reselection of IAB node; Agenda Item: 11.1.5; Source: Huawei, HiSilicon; Document for: Discussion and Decision; Date and Location: May 13-17, 2019, Reno, USA; consisting of 3 pages.

3GPP TSG-RAN WG2 Meeting #107; R2-1908842; Title: Summary of the email discussion [106#43][IAB] Backhaul RLF; Agenda item: 11.1.5; Source: CATT; Document for: Discussion and Decision; Date and Location: Aug. 26-30, 2019, Prague, Czech Republic, consisting of 55 pages.

3GPP TSG-WG3 Meeting #104 R3-192797; Title: IAB Node Integration; Agenda item: 13.2.1.1; Source: Nokia, Nokia Shanghai Bell; Document for: Discussion and Decision; Date and Location: May 13-17, 2019, Reno, NV, USA; consisting of 5 pages.

3GPP TSG-RAN WG3 Meeting #106 R3-196993 Revision of R3-195467; Title: (TP for Nr_IAB BL CR for TS 38.401): Backhaul RLF recovery; Agenda Item: 13.3.2.1; Source: Huawei; Document for: Agreement; Date and Location: Nov. 18-22, 2019, Reno, NV, USA; consisting of 4 pages.

3GPP TSG RAN Meeting #82 RP-182882 (Revision of RP-182810); Title: New WID: Integrated Access and Backhaul for NR; Source: Qualcomm; Document for: Approval; Agenda Item: 9.1.2; Date and Location: Dec. 10-13, 2018, Sorrento, Italy, consisting of 7 pages.

\* cited by examiner (c)

(b)

(a)

METHODS FOR CONTROLLING RE-ESTABLISHMENT OF IAB NODES

CROSS-REFERENCE TO RELATED APPLICATIONS

This application is a Submission Under 35 U.S.C. § 371 for U.S. National Stage Patent Application of International Application No.: PCT/EP2020/081992, filed Nov. 13, 2020 entitled "METHODS FOR CONTROLLING RE-ESTABLISHMENT OF IAB NODES," which claims priority to U.S. Provisional Application No. 62/935,472, filed Nov. 14, 2019, entitled "METHODS FOR CONTROLLING RE-ESTABLISHMENT OF IAB NODES," the entireties of both of which are incorporated herein by reference.

TECHNICAL FIELD

The present disclosure relates to wireless communications, and in particular, to controlling reestablishment of integrated access and backhaul (IAB) nodes.

BACKGROUND

New Radio (NR), also called Next Generation, Fifth Generation or 5G, is an emerging radio access technology (RAT) being developed by the Third Generation Partnership Project (3GPP). NR uses short range millimeter waves for communication between a network node (base station, e.g., gNB) or other network node and wireless devices (WDs). The use of the short range mmWave spectrum in NR creates a need for densified deployment with multi-hop backhauling. However, optical fiber to every base station may be too costly and sometimes not even possible (e.g., at historical sites). A principle of IAB is the use of wireless links for the backhaul (instead of fiber) to enable flexible and very dense deployment of cells without the need for densifying the transport network. Use case scenarios for IAB can include coverage extension, deployment of a massive number of small cells and fixed wireless access (FWA) (e.g., to residential/office buildings). The larger bandwidth available for NR in the mmWave spectrum provides opportunities for self-backhauling, without limiting the spectrum to be used for the access links. Further, the multi-beam and multiple input multiple output (MIMO) support in NR reduces cross-link interference between backhaul and access links, allowing higher densification.

During a study item phase of IAB standards work by the 3GPP such as in study item 3GPP Technical Report (TR) 38.874, a system that leverages the Central Unit (CU)/Distributed Unit (DU) split architecture of NR has been considered, where the IAB node may be hosting a DU part that is controlled by a central unit. The IAB nodes also have a Mobile Termination (MT) part that they use to communicate with their parent nodes.

The specifications for IAB specify reuse of existing functions and interfaces defined in NR. In particular, Mobile Termination (MT), gNB-DU, gNB-CU, user plane function (UPF), Access and Mobility Management Function (AMF) and Session Management Function (SMF), as well as the corresponding interfaces NR Uu (between MT and gNB), F1, NG, X2 and N4, may be used as a baseline for the IAB architectures. Modifications or enhancements to these functions and interfaces for the support of IAB are described in the context of the architecture discussion. Additional functionality such as multi-hop forwarding is included in the architecture discussion as it may be useful for the understanding of IAB operation and since certain aspects may require standardization.

The Mobile-Termination (MT) function has been defined as a component of the IAB node. The MT may be referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP. and potentially other functions. In a deployment, the IAB-donor can be split according to these functions, which can all be either collocated or non-collocated as may be described in 3GPP NG-RAN architecture. IAB-related aspects may arise when such split is implemented. Also, some of the functions presently associated with the IAB-donor may eventually be moved outside of the donor in case it becomes evident that they do not perform IAB-specific tasks.

FIG. 2 is a diagram of a baseline user plane (UP) protocol stack for IAB in 3GPP Rel-16.

As shown in FIG. 3, stacks a, b and c are protocol stacks that reuse the current CU-DU split that may be described in wireless communication standards such as in 3GPP Technical Release Rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both user plane (UP) and control plane (CP) traffic (IPsec in the case of the UP, and datagram transport layer security (DTLS) in the case of the CP). IPsec could also be used for the CP protection instead of DTLS (in which case no DTLS layer would be used).

Backhaul Adaptation Protocol (BAP)

A new protocol layer called Backhaul Adaptation Protocol (BAP) has been introduced in the IAB nodes and the IAB-donor. The BAP is used for routing of packets to the appropriate downstream/upstream node and also mapping the wireless device (WD) bearer data to the proper backhaul radio link control (RLC) channel, (and also between ingress and egress backhaul RLC channels in intermediate IAB nodes), to satisfy the end to end quality of service (QoS) requirements of bearers.

The WD establishes RLC channels to the DU on the WD's access IAB-node such as, for example, in compliance with 3GPP Technical Standard (TS) 38.300. Each of these RLC-channels is extended via F1-U between the WD's access DU and the IAB-donor. The information embedded in F1-U is carried over backhaul RLC-channels across the backhaul links. Transport of F1-U over the wireless backhaul may be performed by the BAP. Since BAP is a newly defined layer for IAB networks, the following considerations related to the BAP layer functionality may have been made:

RAN2 may confirm that routing and bearer mapping (e.g., mapping of backhaul (BH) RLC channels) are BAP layer functions;

RAN2 may assume that the transmit (TX) part of the BAP layer performs routing and "bearer mapping", and the receive (RX) part of the BAP layer performs "bearer de-mapping";

RAN2 may assume that service data units (SDUs) are forwarded from the RX part of the BAP layer to the TX part of the BAP layer (for the next hop) for packets that are relayed by the IAB node; and It remains for future study (FFS) how to model BAP layer protocol entities, e.g., whether separate entities are for DU and MT or not, and how these are configured, i.e., via F1-AP or RRC.

Furthermore, for the BAP routing, the following considerations may have been made:

The BAP routing identification (ID) (carried in the BAP header) consists of the BAP address and BAP path ID. Encoding of the path ID in the header is FFS;

Each BAP address defines a unique destination (unique for an IAB network of one donor-IAB, either an IAB access node or the IAB donor);

Each BAP address can have one or multiple entries in the routing table to enable local route selection. Multiple entries are for load balancing and/or re-routing at radio link failure (RLF). For load balancing it is FFS as to what is decided locally and/or decided by the Donor;

Each BAP routing ID may only one entry in the routing table;

The routing table can hold other information, e.g., priority level for entries with the same BAP address to support local selection. Configuration of this information is optional;

Load balancing by routing by donor-IAB CU is possible; and

Local selection of path/route is performed at link failure, while other cases are FFS.

Backhaul-Link-Failure Recovery Scenarios

Due to various reasons, different scenarios of backhaul-link failure may happen in IAB networks. In the following, some example scenarios are illustrated for backhaul-link failure. Each scenario is depicted with an illustrative figure (FIGS. 4 to 6) aiming at establishing a route between IAB-donor and IAB-node D after BH-link failure, where:

Nodes A1 and A2 are IAB-donor nodes; nodes B to H are IAB-nodes;

A fine dashed line represents the established connection between two nodes; and

The arrows represents the established route after BH-link failure and the coarse dashed lines indicate a newly established link.

Again, FIGS. 2 and 3 illustrate IAB node protocol stacks.

Scenario 1

In this scenario (FIG. 4), the backhaul-link failure occurs between on upstream IAB-node (e.g., IAB-node C) and one of its parent IAB-nodes (e.g., IAB-node B), where the upstream IAB-node (IAB-node C) has an additional link established to another parent node (IAB-node E).

Scenario 2

In this scenario (FIG. 5), the backhaul-link failure occurs between an upstream IAB-node (e.g., IAB-node C) and all its parent IAB-nodes (e.g., IAB-nodes B and E). The upstream IAB-node (IAB-node C) has to reconnect to a new parent node (e.g., IAB-node F), and the connection between IAB-node F and IAB-node C is newly established).

Scenario 3

In this scenario (FIG. 6), the backhaul-link failure occurs between IAB-node C and IAB-node D. IAB-node D has to reconnect to the new IAB-donor (e.g., IAB-donor A2) via a new route.

The following discussions related to RLF have been made by 3GPP:

RAN2 may assume that there is an RLF-notification at BH RLF, at least to downstream node(s);

Alternate routes and/or Dual Connectivity could be utilized at recovery at a failure of a BH link;

Current WD RLF detection and recovery is reused as baseline; and

It is FFS, whether other indications are needed, e.g., when the link has recovered, or when recovery is in progress.

The following options were discussed in 3GPP with regard to backhaul RLF notifications:

Type 1—"Plain" notification: Indication that BH link RLF is detected by the IAB-node;

Type 2—"Trying to recover": Indication that BH link RLF is detected by the IAB-node; and the IAB-node is attempting to recover from it;

Type 3—"BH link recovered": Indication that the BH link successfully recovers from RLF; and Type 4—"Recovery failure": Indication that the BH link RLF recovery failure occurs.

Consider an example scenario shown in FIG. 7 below:

When a child IAB node (i.e., IAB3 or IAB2) that is not operating in dual connectivity receives in the BAP header an RLF notification from the parent node (IAB1), the IAB node (IAB3 or IAB2) may perform an RRC Connection reestablishment. This procedure implies that the IAB-MT node has to find a suitable cell to camp in before performing an RRC Connection Re-establishment.

It is likely that the IAB-MT of IAB2 or IAB3 camps and accesses the same cell of IAB1 or another cell belonging to IAB1 from which it got the RLF notification (as the reestablishment is being trigged not because of bad radio link between the IAB-MT of IAB2 or IAB3 and the parent cell (i.e., IAB1), but because the parent node (IAB1) has lost connectivity to its own parent (i.e., IAB0). This could lead to the IAB2 and IAB3 node not being able to transmit/receive data again.

Another related problem is that the child node that received the BH RLF indication could end up camping in a cell belonging to another child node of the parent node that has just sent the BH RLF indication. For the scenario above, IAB3 may end up camping in a cell belonging to IAB2 (or vice versa). In this case, performing reestablishment would not succeed as both nodes share the same parent and thus have lost connectivity to the network (i.e., IAB-donor CU).

SUMMARY

It may be an object of the present invention to provide measures with which successful reestablishment of a connection to integrated access and backhaul (IAB) node can be accomplished in an easy and efficient way.

Some embodiments advantageously provide methods, systems, and apparatuses for controlling reestablishment of integrated access and backhaul (IAB) nodes.

Some embodiments include mechanisms to ensure that an Radio Resource Control (RRC) reestablishment procedure at an IAB node that was triggered due to the reception of a BH RLF notification succeeds. Two embodiments may include:

Mechanisms/processes to prevent the IAB node from camping on a cell belonging to the parent node that sent the BH RLF notification; and Mechanisms/processes to prevent the IAB node from camping on a cell belonging to any other IAB node served by the parent node that sent the BH RLF notification.

Therefore, the teachings of the present disclosure provide one or more advantages over existing system. For example, one advantage provided by the present disclosure is that it helps avoid IAB nodes camping in a cell that do not have any connectivity/service towards the IAB donor DU/CU and thereby helps ensure that reestablishment succeeds, so that connectivity with the network can be restored.

Without the teachings of the present disclosure, it is possible that several IAB nodes and WDs served by a network may be disadvantageously disconnected from the network for a considerable period of time, for example: until the WDs move, experience radio link failure towards the cell of the IAB node serving them, but have no connectivity to the IAB-donor CU or DU, and/or perform reestablishment to a cell belonging to an IAB node that still has connectivity with the IAB-donor CU or DU).

According to one aspect of the disclosure, a first integrated access and backhaul (IAB) node is provided. The first IAB node includes processing circuitry configured to, responsive to receiving a radio link failure, RLF, indication from a second IAB node, consider at least the second IAB node to be at least temporarily unsuitable for camping on a cell of the second IAB node. The processing circuity is configured to, responsive to the second IAB node being considered to be at least temporarily unsuitable for camping, cease to camp on the second IAB node for connection reestablishment.

According to one or more embodiments, the processing circuity is further configured to, responsive to receiving a radio link failure, RLF, indication from the second IAB node, consider at least one child IAB node to the second IAB node to be unsuitable for camping for connection reestablishment. According to one or more embodiments, the RLF indication is received in one of backhaul adaptation protocol, BAP, control protocol data unit, PDU, and system information. According to one or more embodiments, the RLF indication includes cell identifiers of a plurality of IAB nodes where each respective cell identifier of the plurality of identifiers is one of unsuitable for camping for connection reestablishment and suitable for camping for connection reestablishment.

According to one or more embodiments, the at least second IAB node is considered to be unsuitable for camping for a predefined time period. According to one or more embodiments, the processing circuitry is further configured to, responsive to receiving the RLF indication from the second IAB node, change system information to indicate at least one cell associated with the first IAB node is unsuitable for camping for connection reestablishment. The processing circuitry being further configured to broadcast the changed system information. According to one or more embodiments, the processing circuity is further configured to, responsive to receiving the RLF indication from the second IAB node, broadcast system information that indicates at least one cell associated with the second IAB node is unsuitable for camping for connection reestablishment. According to one or more embodiments, the first IAB node is a child IAB node and the second IAB node is a parent IAB node.

According to another aspect of the disclosure, a parent integrated access and backhaul (IAB) node is provided. The parent IAB node includes processing circuitry configured to detect that a radio link failure, RLF, has occurred and transmit a RLF indication to a first IAB node to indicate that the parent IAB node is at least temporarily unsuitable for camping for connection reestablishment.

According to one or more embodiments, the RLF indication is transmitted in one of backhaul adaptation protocol, BAP, control protocol data unit, PDU, and system information. According to one or more embodiments, the RLF indication includes cell identifiers of a plurality of IAB nodes that are one of unsuitable for camping for connection reestablishment and suitable for camping for connection reestablishment. According to one or more embodiments, the RLF indication indicates a predefined timer period for which the parent IAB node is unsuitable for camping for connection reestablishment.

According to another aspect of the disclosure, a method for a first integrated access and backhaul (IAB) node is provided. Responsive to receiving a radio link failure, RLF, indication from a second IAB node, at least the second IAB node is considered to be at least temporarily unsuitable for camping on a cell of the second IAB node. Responsive to the second IAB node being considered to be at least temporarily unsuitable for camping, cease to camp on the second IAB node for connection reestablishment.

According to one or more embodiments, responsive to receiving a radio link failure, RLF, indication from the second IAB node, consider at least one child IAB node to the second IAB node to be unsuitable for camping for connection reestablishment. According to one or more embodiments, the RLF indication is received in one of backhaul adaptation protocol, BAP, control protocol data unit, PDU, and system information. According to one or more embodiments, the RLF indication includes cell identifiers of a plurality of IAB nodes where each respective cell identifier of the plurality of identifiers is one of unsuitable for camping for connection reestablishment and suitable for camping for connection reestablishment.

According to one or more embodiments, the at least second IAB node is considered to be unsuitable for camping for a predefined time period. According to one or more embodiments, responsive to receiving the RLF indication from the second IAB node, system information is changed to indicate at least one cell associated with the first IAB node is unsuitable for camping for connection reestablishment and the changed system information is broadcast. According to one or more embodiments, responsive to receiving the RLF indication from the second IAB node, system information is broadcast where the system information indicates at least one cell associated with the second IAB node is unsuitable for camping for connection reestablishment. According to one or more embodiments, the first IAB node is a child IAB node and the second IAB node is a parent IAB node.

According to another aspect of the disclosure, a method for parent integrated access and backhaul (IAB) node is provided. A detection is made that a radio link failure, RLF, has occurred. A RLF indication is transmitted to a first IAB node to indicate that the parent IAB node is at least temporarily unsuitable for camping for connection reestablishment.

According to one or more embodiments, the RLF indication is transmitted in one of backhaul adaptation protocol, BAP, control protocol data unit, PDU, and system information. According to one or more embodiments, the RLF indication includes cell identifiers of a plurality of IAB nodes where each respective cell identifier of the plurality of identifiers is one of unsuitable for camping for connection reestablishment and suitable for camping for connection reestablishment. According to one or more embodiments, the RLF indication indicates a predefined timer period for which the parent IAB node is unsuitable for camping for connection reestablishment.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
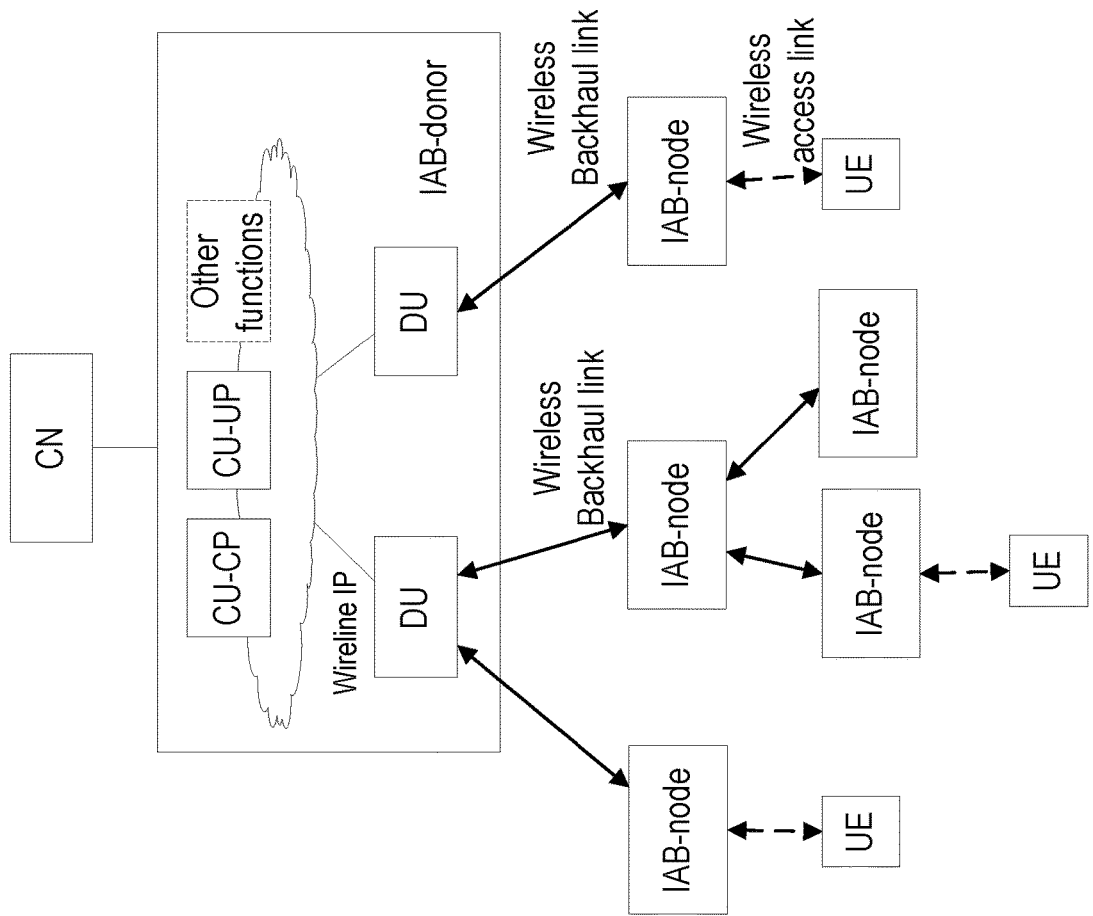
FIG. 1 is a block diagram of an IAB system architecture.
Figure 2:
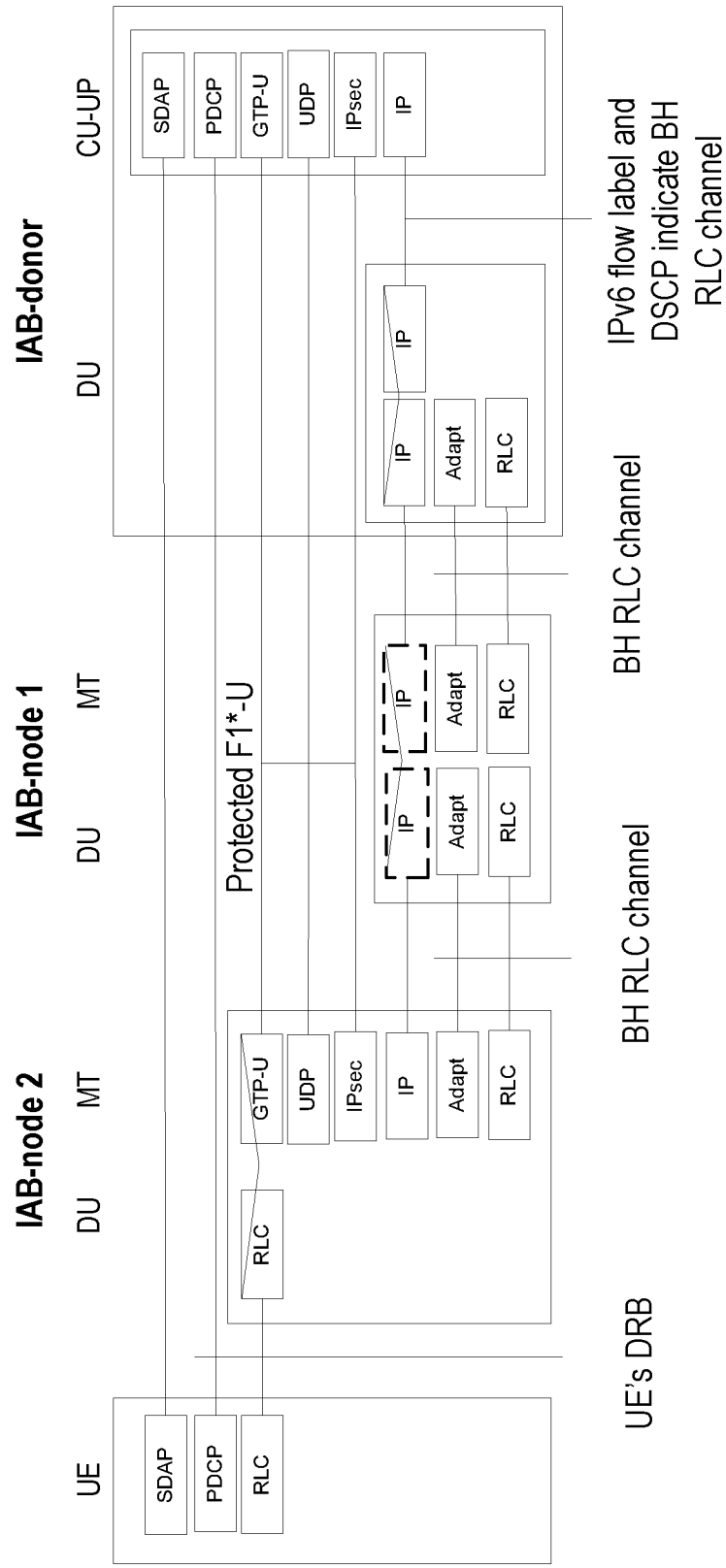
FIG. 2 is a block diagram of an IAB node protocol stacks.
Figure 3:
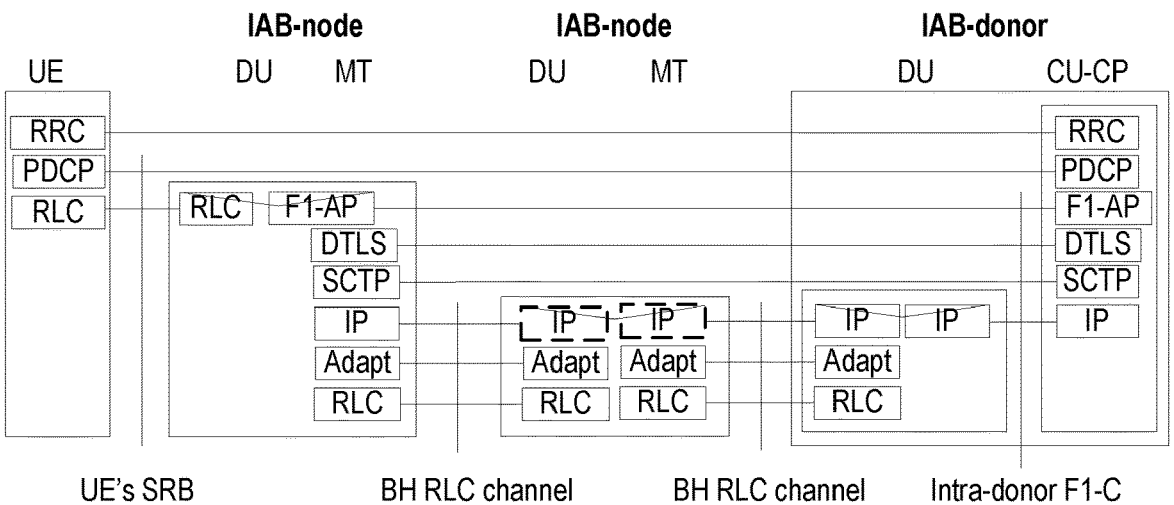
FIG. 3 is a diagram showing additional example block diagrams of IAB node protocol stacks.
Figure 3:
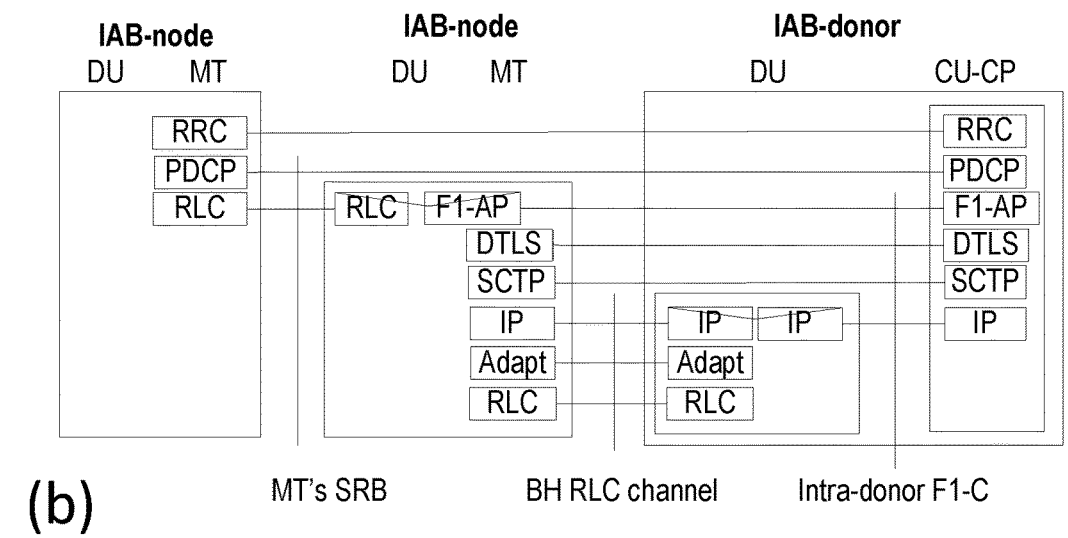
Figure 3:
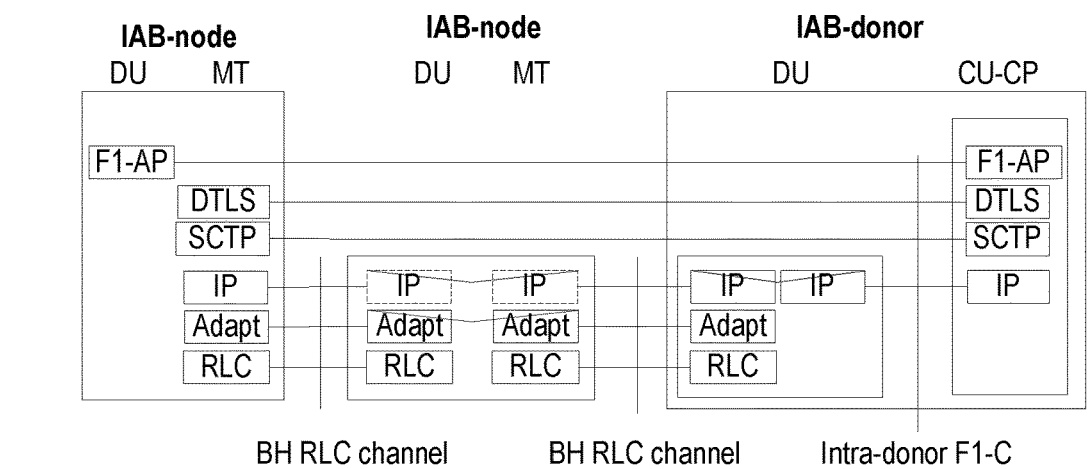
Figure 4:
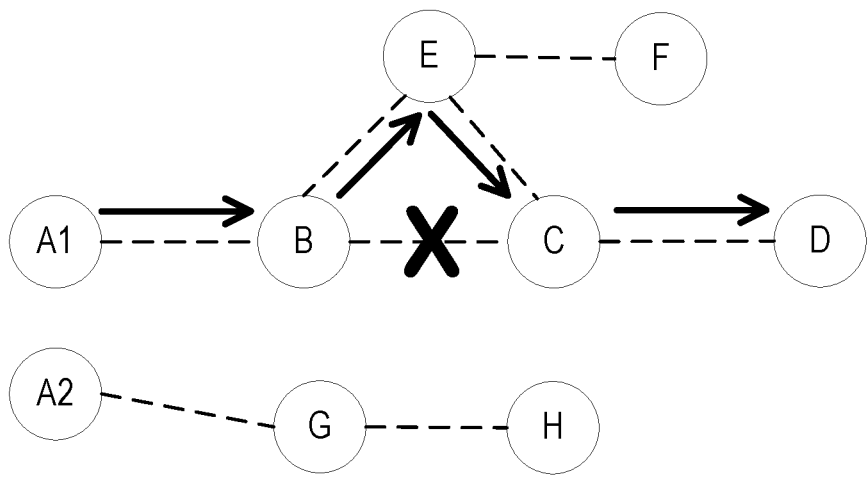
FIG. 4 is a diagram of a first scenario of RLF between IAB nodes.
Figure 5:
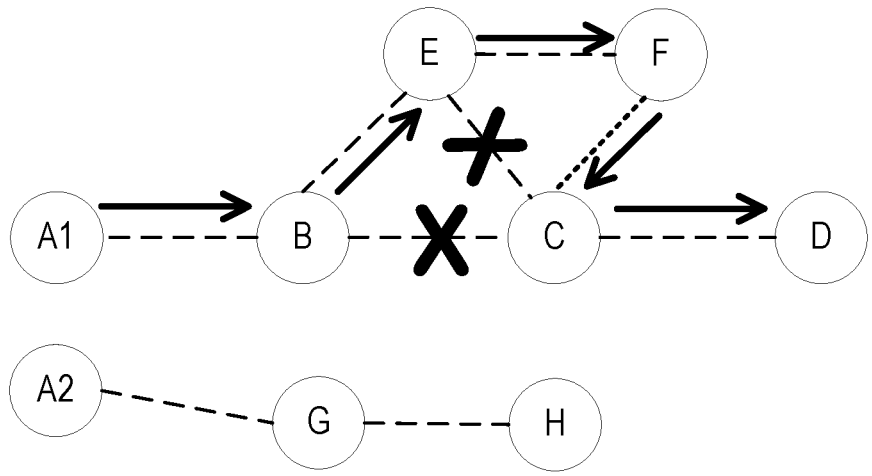
FIG. 5 is a diagram of a second scenario of RLF between IAB nodes.
Figure 6:
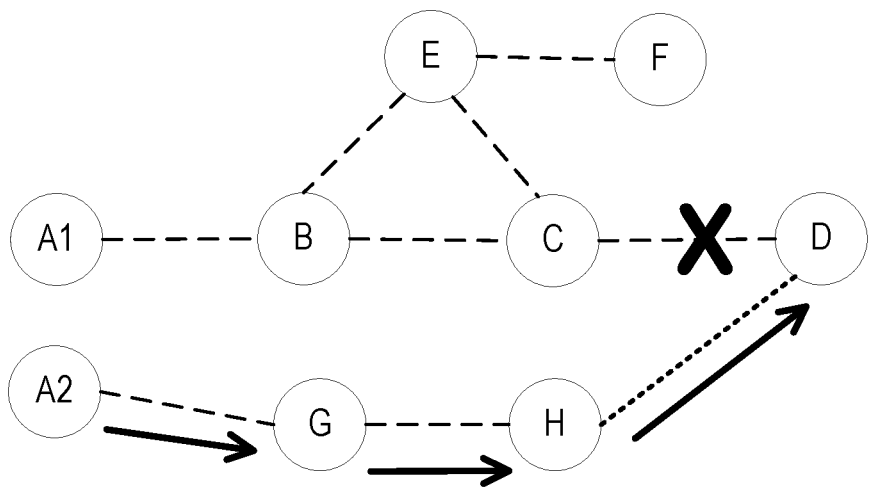
FIG. 6 is a diagram of a third scenario of RLF between IAB nodes.

Before describing in detail exemplary embodiments, it is noted that the embodiments reside primarily in combinations of apparatus components and processing steps related to controlling reestablishment of integrated access and backhaul (IAB) nodes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "IAB node" may refer to a network node or wireless device operating as an IAB node.

The term "system information" may refer to one or more of system information block(s), SIB(s), master information block(s), MIB(s), and positioning SIB(s).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB or IAB node) transmits and/or may transmit data (which may be data other than broadcast data) to a user equipment (or IAB node such a via a wireless backhaul, for example), in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC connected or RRC idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 8:
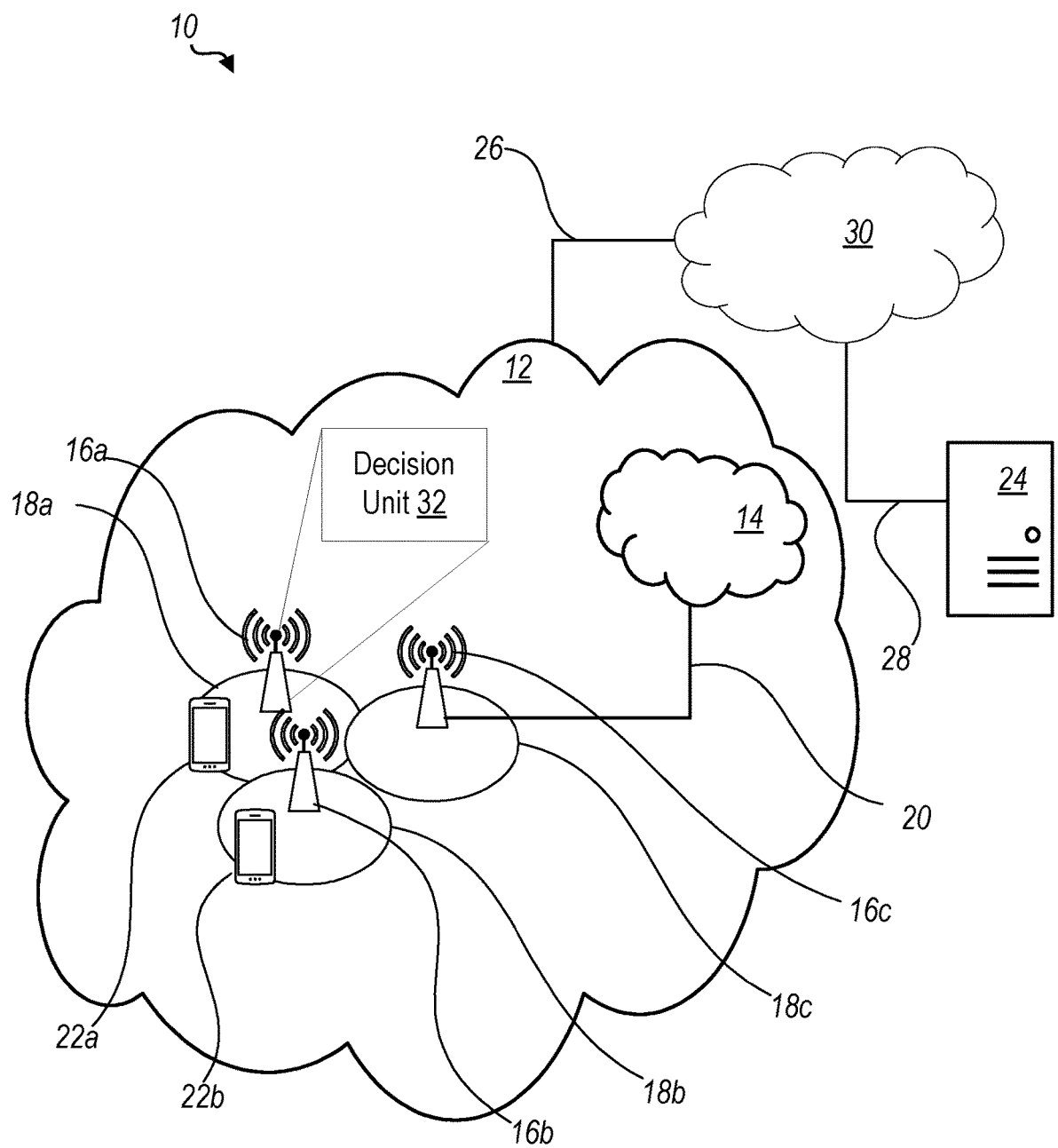
FIG. 8 is a schematic diagram of an example network architecture illustrating a communication system connected via an intermediate network to a host computer according to the principles in the present disclosure.

Some embodiments provide for controlling reestablishment of integrated access and backhaul (IAB) nodes. Returning now to the drawing figures, in which like elements are referred to by like reference numerals, there is shown in FIG. 8 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Some or all of the network nodes 16 may be IAB nodes, which may include IAB donor nodes, IAB parent nodes (also referred to as parent nodes) and IAB child nodes (also referred to as child nodes). Also, some WDs function as IAB nodes, in some embodiments. Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 8 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16, operating as an IAB node, is configured to include a decision unit 32 which is configured to make a decision concerning encampment on a cell served by another IAB node 16.

Example implementations, in accordance with an embodiment, of the WD 22, network node 16 and host computer 24 discussed in the preceding paragraphs will now be described with reference to FIG. 9. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16, operating as an IAB node, may include a decision unit 32 which is configured to make a decision concerning encampment on a cell served by another IAB node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 9:
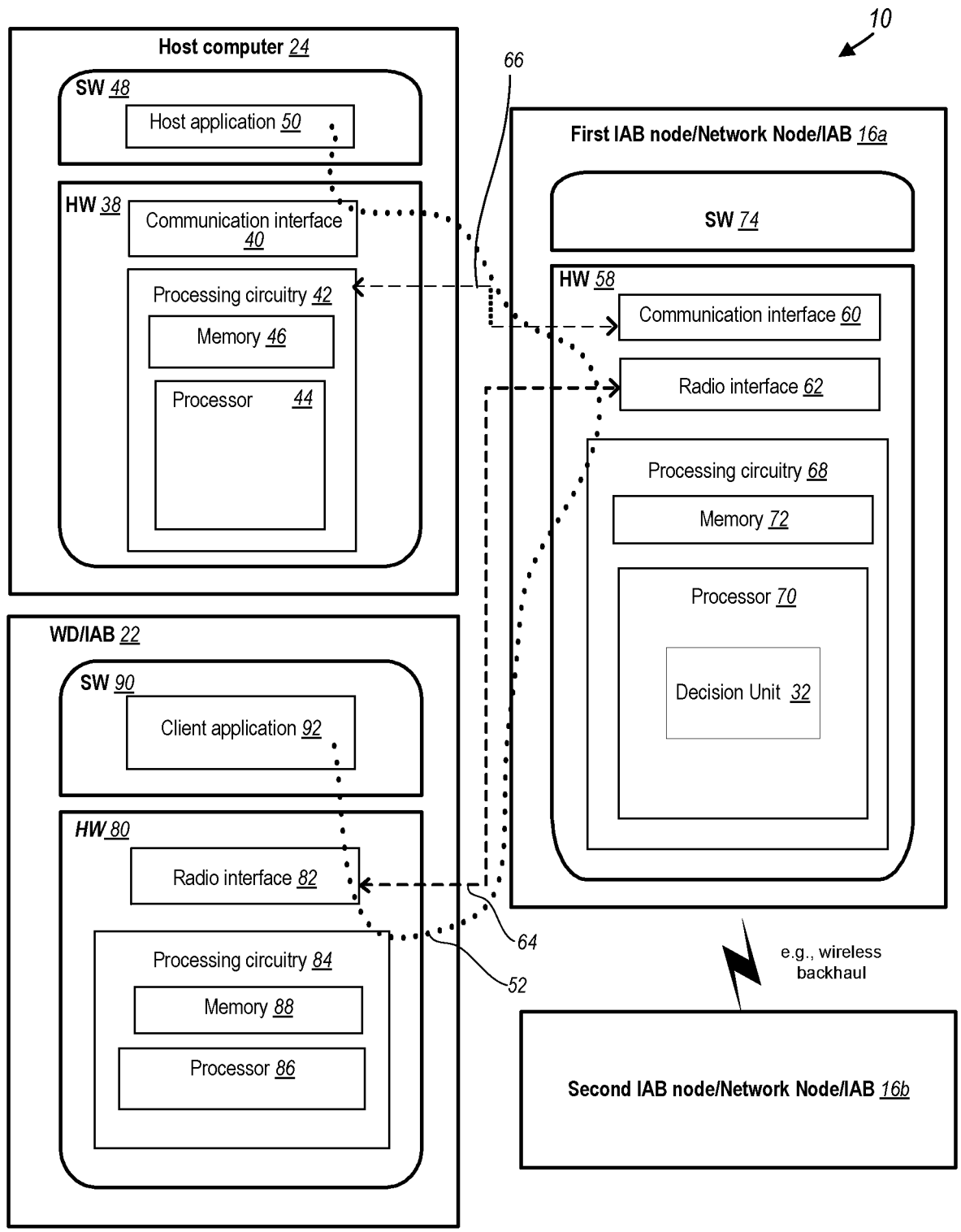
FIG. 9 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 9 and independently, the surrounding network topology may be that of FIG. 8.

In FIG. 9, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 8 and 9 show various "units" such as decision unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 10:
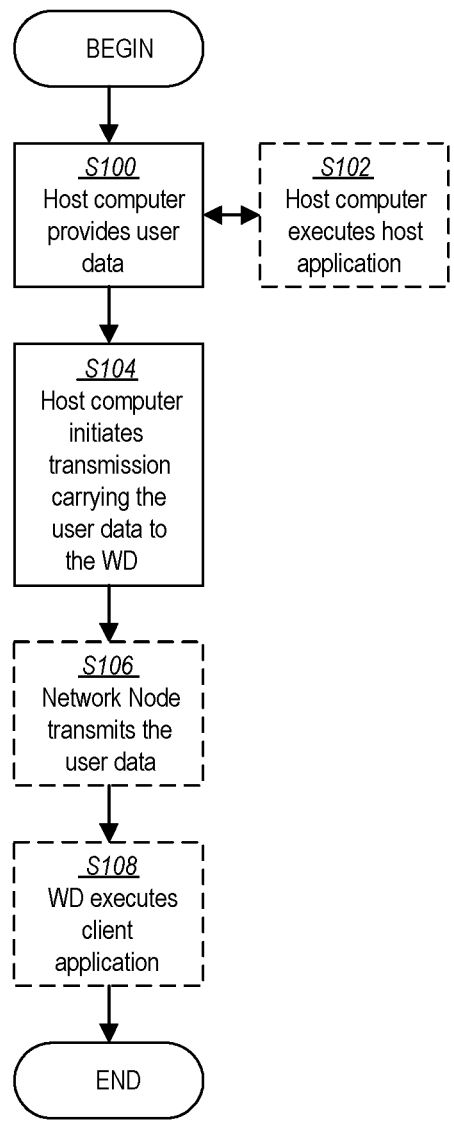
FIG. 10 is a flowchart illustrating example methods implemented in a communication system including a host computer, a network node and a wireless device for executing a client application at a wireless device according to some embodiments of the present disclosure.

FIG. 10 is a flowchart illustrating an example method implemented in a communication system, such as, for example, the communication system of FIGS. 8 and 9, in accordance with one embodiment. The communication system may include a host computer 24, a network node 16 and a WD 22, which may be those described with reference to FIG. 9. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 11:
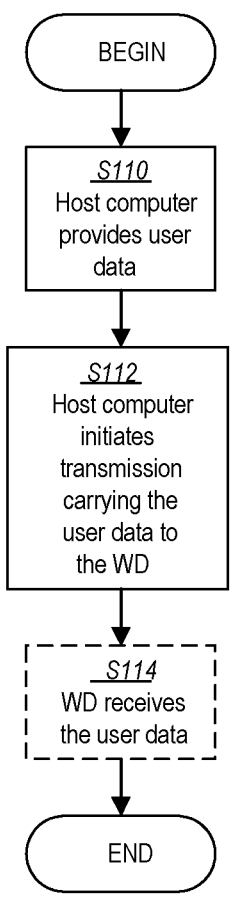
FIG. 11 is a flowchart illustrating example methods implemented in a communication system including a host computer, a network node and a wireless device for receiving user data at a wireless device according to some embodiments of the present disclosure.

FIG. 11 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 12:
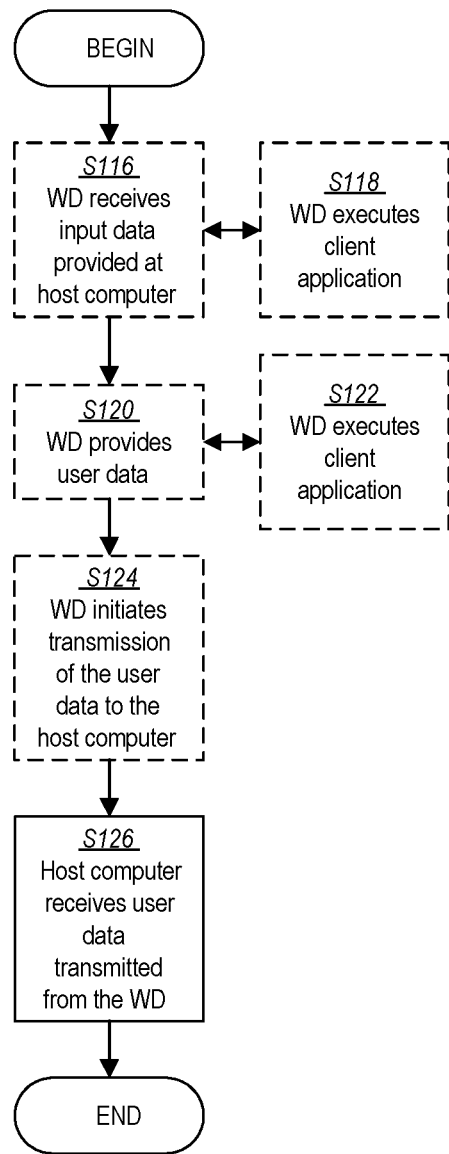
FIG. 12 is a flowchart illustrating example methods implemented in a communication system including a host computer, a network node and a wireless device for receiving user data from the wireless device at a host computer according to some embodiments of the present disclosure.

FIG. 12 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 13:
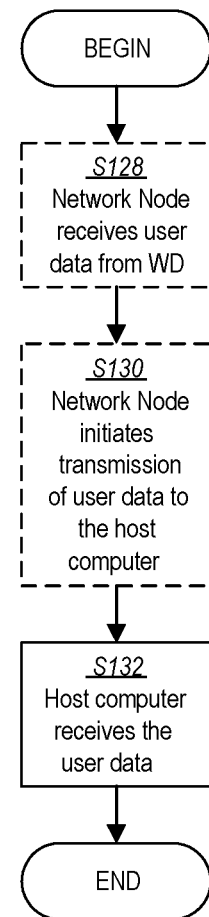
FIG. 13 is a flowchart illustrating example methods implemented in a communication system including a host computer, a network node and a wireless device for receiving user data at a host computer according to some embodiments of the present disclosure.

FIG. 13 is a flowchart illustrating an example method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 14:
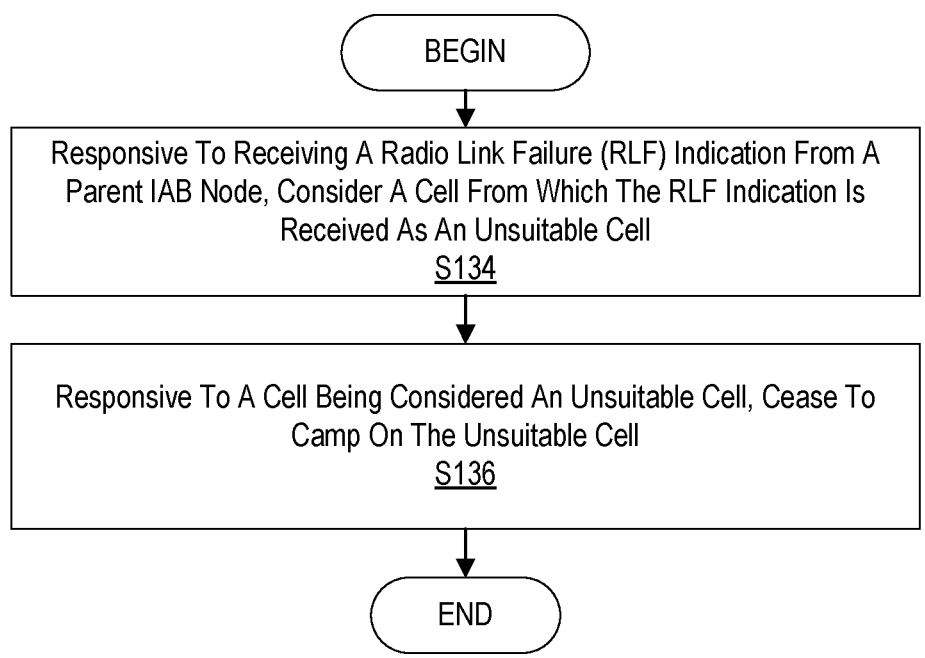
FIG. 14 is a flowchart of an example process in a network node for controlling reestablishment of integrated access and backhaul (IAB) nodes.

FIG. 14 is a flowchart of an example process in a network node 16 for controlling reestablishment of integrated access and backhaul (IAB) nodes. One or more blocks described herein may be performed by one or more elements of network node 16 such as by one or more of processing circuitry 68 (including decision unit 32), processor 70, radio interface 62 and/or communication interface 60. Network node 16 such as via processing circuitry 68 and/or processor 70 and/or radio interface 62 and/or communication interface 60 is configured to, responsive to receiving a radio link failure (RLF) indication from a parent IAB node, consider a cell from which the RLF indication is received as an unsuitable cell as described herein (Block S134). The process also includes, responsive to a cell being considered an unsuitable cell, ceasing to camp on the unsuitable cell, as described herein (Block S136).

Figure 15:
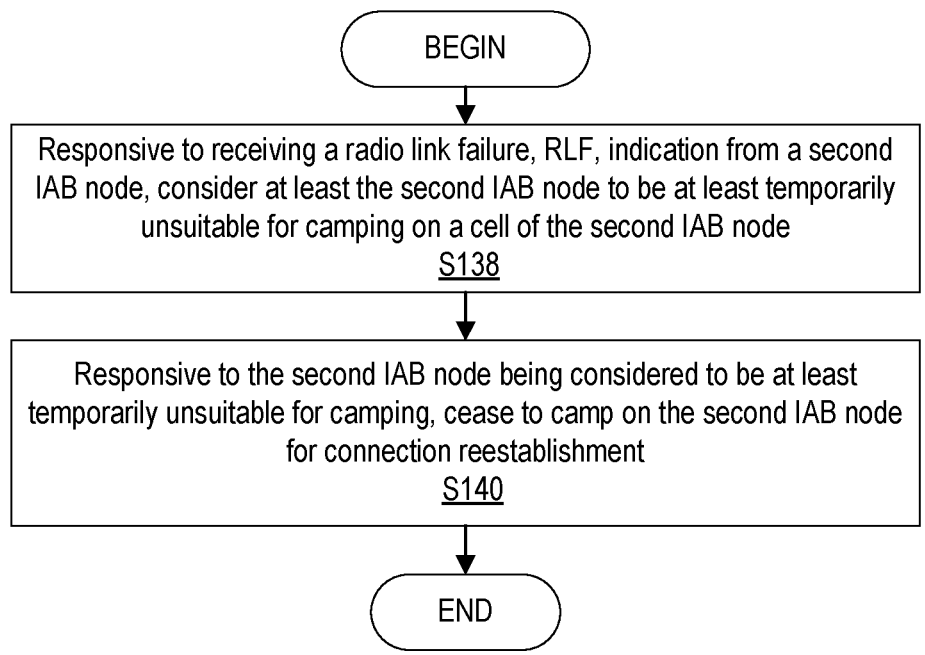
FIG. 15 is a flowchart of another example process in a network node for controlling reestablishment of integrated access and backhaul (IAB) nodes.

FIG. 15 is a flowchart of an example process in a network node 16 such as a first IAB node for controlling reestablishment of integrated access and backhaul (IAB) nodes. One or more blocks described herein may be performed by one or more elements of network node 16 such as by one or more of processing circuitry 68 (including decision unit 32), processor 70, radio interface 62 and/or communication interface 60. Network node 16 such as via processing circuitry 68 and/or processor 70 and/or radio interface 62 and/or communication interface 60 is configured to, responsive to receiving a radio link failure, RLF, indication from a second IAB node 16, consider (Block S138) at least the second IAB node 16 to be at least temporarily unsuitable for camping on a cell of the second IAB node 16, as described herein. Network node 16 such as via processing circuitry 68 and/or processor 70 and/or radio interface 62 and/or communication interface 60 is configured to, responsive to the second IAB node being considered to be at least temporarily unsuitable for camping, cease (Block S140) to camp on the second IAB node for connection reestablishment, as described herein.

According to one or more embodiments, the processing circuitry 68 is further configured to, responsive to receiving a radio link failure, RLF, indication from the second IAB node 16, consider at least one child IAB node 16 to the second IAB node 16 to be unsuitable for camping for connection reestablishment, as described herein. According to one or more embodiments, the RLF indication is received in one of backhaul adaptation protocol, BAP, control protocol data unit, PDU, and system information. According to one or more embodiments, the RLF indication includes cell identifiers of a plurality of IAB nodes 16 where each respective cell identifier of the plurality of identifiers is one of unsuitable for camping for connection reestablishment and suitable for camping for connection reestablishment.

According to one or more embodiments, the at least second IAB node 16 is considered to be unsuitable for camping for a predefined time period. According to one or more embodiments, the processing circuitry 68 is further configured to, responsive to receiving the RLF indication from the second IAB node 16, change system information to indicate at least one cell associated with the first IAB node 16 is unsuitable for camping for connection reestablishment. The processing circuitry 68 is further configured to, responsive to receiving the RLF indication from the second IAB node 16, broadcast the changed system information such as SIB. According to one or more embodiments, the processing circuitry 68 is further configured to, responsive to receiving the RLF indication from the second IAB node 16, broadcast system information that indicates at least one cell associated with the second IAB node 16 is unsuitable for camping for connection reestablishment. According to one or more embodiments, the first IAB node is a child IAB node 16 and the second IAB node 16 is a parent IAB node 16.

Figure 16:
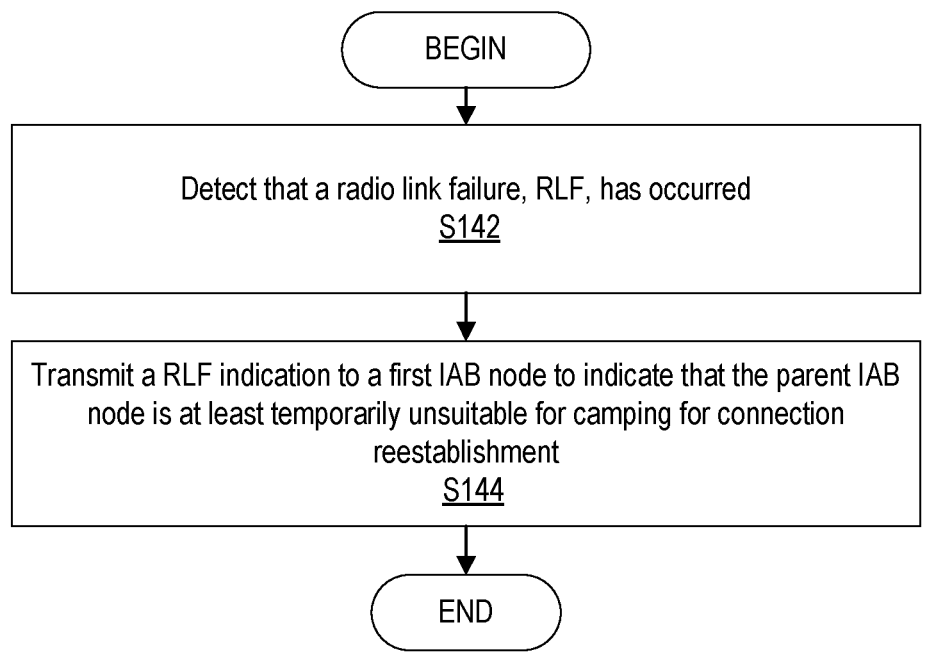
FIG. 16 is a flowchart of an example process in a network node such as a Parent IAB node for controlling reestablishment of integrated access and backhaul (IAB) nodes.
Figure 17:
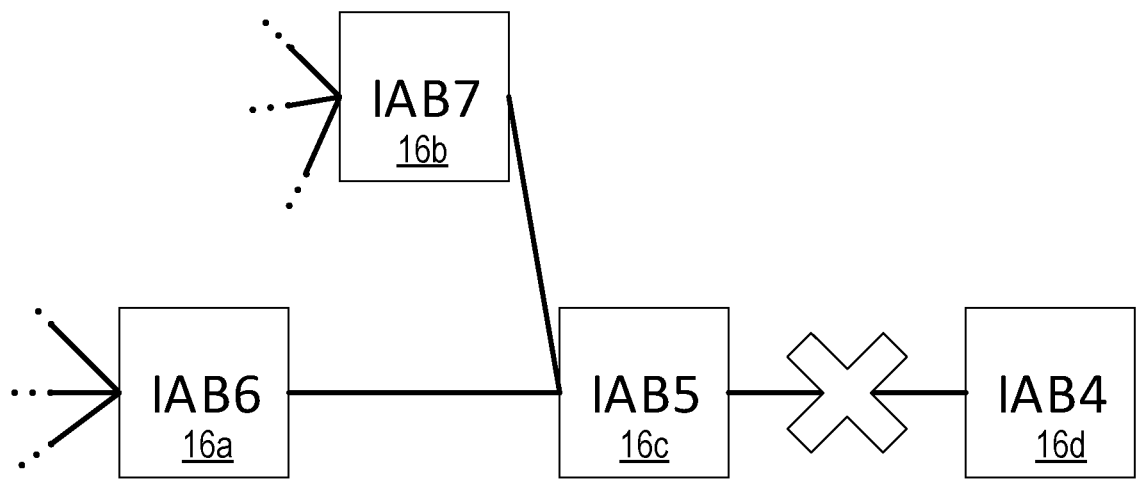
FIG. 17 is block diagram of IAB nodes with a failed link.

FIG. 16 is a flowchart of an example process in a network node 16 such as a parent IAB node 16 for controlling reestablishment of integrated access and backhaul (IAB) nodes. One or more blocks described herein may be performed by one or more elements of network node 16 such as by one or more of processing circuitry 68 (including decision unit 32), processor 70, radio interface 62 and/or communication interface 60. Network node 16 such as via processing circuitry 68 and/or processor 70 and/or radio interface 62 and/or communication interface 60 is configured to detect (Block S142) that a radio link failure, RLF, has occurred, as described herein. Network node 16 such as via processing circuitry 68 and/or processor 70 and/or radio interface 62 and/or communication interface 60 is configured to transmit (Block S144) a RLF indication to a first IAB node 16 to indicate that the parent IAB node 16 is at least temporarily unsuitable for camping for connection reestablishment, as described herein.

According to one or more embodiments, the RLF indication is transmitted in one of backhaul adaptation protocol, BAP, control protocol data unit, PDU, and system information. According to one or more embodiments, the RLF indication includes cell identifiers of a plurality of IAB nodes 16 where each respective cell identifier of the plurality of identifiers is one of unsuitable for camping for connection reestablishment and suitable for camping for connection reestablishment. According to one or more embodiments, the RLF indication indicates a predefined timer period for which the parent IAB is unsuitable for camping for connection reestablishment.

Having described the general process flow of arrangements of the disclosure and having provided examples of hardware and software arrangements for implementing the processes and functions of the disclosure, the sections below provide details and examples of arrangements for controlling reestablishment of integrated access and backhaul (IAB) nodes. As used herein, IAB and/or node may generally refer to a network node 16 and/or IAB 16 such that, for example, a parent node may correspond to a parent IAB 16 and/or parent IAB node 16 and/or a parent IAB network node 16.

Example 1: Barring of the Cells Belonging to the Parent Node

Example 1.1: Barring Indication Via BAP

In this Example, when the child IAB-MT node receives an RLF indication, the IAB-MT considers, via, for example, one or more of the processing circuitry 68, the communication interface 60, the radio interface 62, the decision unit 32, etc., the cell from which the message (i.e., with the RLF indication) was transmitted as an unsuitable cell. This can be either indefinitely or for a pre-defined period of time, regardless of whether it may be the strongest cell, e.g., cell providing one or more of the strongest signal, performance, etc. In case a time duration was specified, after this period of time, the IAB-MT node may consider, via, for example, one or more of the processing circuitry 68, the communication interface 60, the radio interface 62, the decision unit 32, etc., the cell as a suitable cell. The duration that the parent cell may not be considered a suitable cell could be indicated in the BAP control packet data unit (PDU) that indicated the BH RLF or specified in 3GPP specifications (e.g., a fixed value or a random value between two fixed values). The timer value can be set to a very large value (or infinity) to indicate that the cell may not be considered for camping again such as, for example, until another message received by the IAB-MT enables it, and/or until the IAB-MT has successfully re-established to another cell and experiences an RLF to that cell later or receives a BH RLF indication from the new parent node/cell.

In one variant of this embodiment, all cells that belong to the IAB node that has sent the BH RLF indication may not be considered suitable for the indicated timer duration/predefined time period (or indefinitely, if no time duration was included). The IAB-MT may then have to, when performing cell selection for camping via, for example, one or more of the processing circuitry 68, the communication interface 60, the radio interface 62, the decision unit 32, etc., check the cell global identifier (CGI) of the cell to ensure that it does not belong to the same parent node as the cell it belonged to when it received the BH RLF indication.

In some embodiments, a bit in the BAP header explicitly indicates to the IAB-MT if it should or should not consider the cell from which the message was transmitted as a suitable cell after the timer expired.

Example 1.2: Barring Indication Via System Information Such as SIB

In this example, upon detecting an RLF, not being able to recover from the RLF, and deciding to send a BH RLF indication to children nodes (i.e., children IAB nodes 16), a distributed unit (DU) of the IAB node 16 may change, via, for example, one or more of the processing circuitry 68, the communication interface 60, the radio interface 62, the decision unit 32, etc., information in the system information such as in system information block (SIB) (e.g., cell barring information, IAB support indication, etc.) that it is broadcasting. Since, in a CU-DU split, the DU is responsible for encoding the master information block (MIB) and SIB1, the IAB-DU can change the cell barring information without a mandate from the donor CU. However, the IAB-DU can be configured by the donor CU to apply such a change in the SIB1 under certain conditions (e.g., "If IAB-DU loses connectivity to a parent node, and reestablishment does not succeed, enable the cell barring fields in SIB1"). Such a behavior can be either specified in 3GPP specifications or performed via network implementation.

Example 2: Preventing Camping in a Cell Belonging to Another Child Node

Example 2:1: Barring Indication Via System Information Such as SIB

In this example, the child IAB nodes (i.e., network node/IAB 16) that have received a BH RLF indication could change cell barring information (e.g., SIB1) to prevent other IAB nodes 16/WDs 22 from camping on their cells until they have acquired connectivity to a new cell/node. In the example in FIG. 15, IAB3 via, for example, one or more of the processing circuitry 68, the communication interface 60, the radio interface 62, the decision unit 32, etc., could change SIB1 to prevent other IABs (e.g., IAB6) from camping in/on it such that, responsive to a RLF indication, IAB3 changes system information to indicate at least one cell associated with it is unsuitable for camping. IAB6, upon reacquiring SIB1 of IAB5, would read that it is now allowed to camp in that cell and would consider it as an unsuitable cell. Once IAB7 via, for example, one or more of the processing circuitry 68, the communication interface 60, the radio interface 62, the decision unit 32, etc., has restored its connectivity via another parent node (i.e., parent IAB node), it can revert the changes in the SIB to allow other IAB nodes/WDs to camp on it. Similar to Example 1.2 above, this can be a configurable behavior where the donor-CU configures the IAB-DU which is either specified in 3GPP or realized via network implementation.

Figure 7:
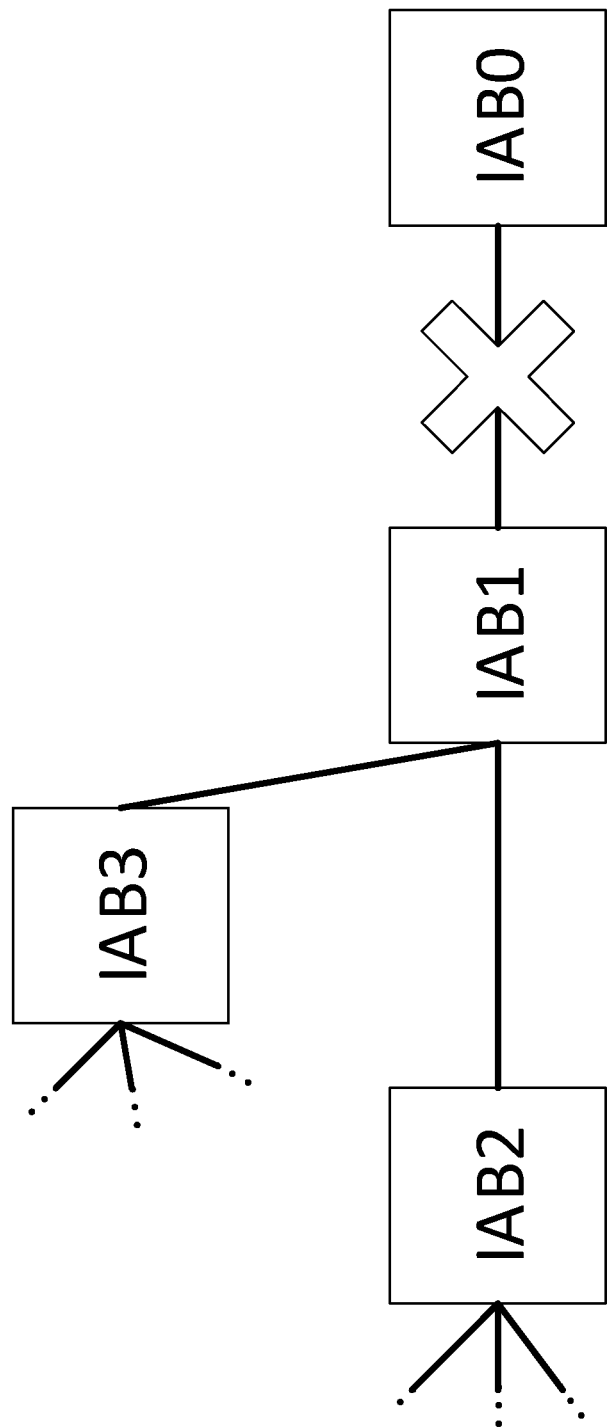
FIG. 7 is a diagram of a fourth scenario of RLF between IAB nodes.

Example 2:2: Serving Cell/Node Information in System Information Such as SIB In this example, child IAB nodes 16 provide, via, for example, one or more of the processing circuitry 68, the communication interface 60, the radio interface 62, the decision unit 32, etc., information regarding the identity of their parent cell or node (e.g., PCI, CGI, gNB/DU ID, etc.) such that, for example, responsive to a RLF indication, child IAB node 16 broadcast system information to indicate at least one cell associated with the parent IAB node 16 is unsuitable for camping. This can be encoded by the DUs (e.g., in SIB1) or it can be information that is broadcasted in another SIB which is provided/encoded by the donor-CU and provided to the IAB-DU when an IAB node 16 connects to the network or changes a parent node/cell. That way, when IAB node 16 has to perform reestablishment and associated cell re-selection, it (i.e., the IAB 16) may check to see if it had the same parent node or cell as the cell that it is trying to camp on, and if so, may not consider this cell as a candidate cell even if the signal strength towards this cell was the best among the cells it can detect. In the example scenario shown in FIG. 7, since both IAB7 (e.g., IAB node 16b) and IAB6 (e.g., IAB node 16a) were being served by the same parent IAB node 16 (IAB1), they may broadcast this information in their SIB (either the cell identity or node identity). Thus, IAB6 and IAB7 may not try to camp on each other's cell upon cell re-selection that was triggered due to the reception of a BH RLF failure indication from IAB5, as they both can determine that they were being served by the same parent node/cell.

Similar to Examples 1.2 and 2.1 above, this can be a configurable behavior where the donor-CU configures the IAB-DU, which is either specified in 3GPP or realized via network implementation.

Example 3: Indication of Candidate Cells for Cell Re-Selection

In this example, the BAP control PDU, when the BAP control PDU includes the RLF indication, also includes in the message the cell or cells to which the IAB node 16 via, for example, one or more of the processing circuitry 68, the communication interface 60, the radio interface 62, the decision unit 32, etc., may attempt to camp on and re-establish. Similar to Example 1, time duration information where this list is applicable could be included in the BAP control PDU.

Example 4: Indication of Cells Not Suitable for Camping/Cell Re-Selection

In this example, the BAP control PDU, when the BAP control PDU includes the RLF indication, also includes in the message the cell or cells to which the IAB node 16 may not attempt to camp on and re-establish (e.g., all cells belonging to the parent IAB node 16, cells belonging to all child IAB nodes 16 of the parent IAB nodes 16, cells belonging to IAB nodes 16 connected to a different IAB-node CU, etc.). Similar to Example 1, time duration information, where this list is applicable, could be included in the BAP control PDU.

Example 5: Indication of CUs for which Cells Belonging to a Given CU are (not) Suitable for Camping/Cell Re-Selection In this example, the BAP control PDU, when it includes the RLF indication, also includes in the message the CUs to which the IAB node 16 may attempt or not attempt to access. Then, all cells which belong to the indicated CUs are allowed or not allowed for camping. Alternatively, the BAP control PDU can also provide a subset of those cells within the indicated CUs. This example may require that the cells provide information about the CU to which they are connected.

According to one aspect, a first integrated access and backhaul (IAB) node 16 configured to communicate with at least a second IAB node 16. The first IAB node 16 includes a radio interface 62 and/or comprising processing circuitry 68 configured to, responsive to receiving a radio link failure (RLF) indication from a parent IAB node 16, consider a cell from which the RLF indication is received as an unsuitable cell, and responsive to a cell being considered an unsuitable cell, cease to camp on the unsuitable cell.

According to this aspect, in some embodiments, further responsive to the cell being considered unsuitable, the first IAB node 16, radio interface 62 and processing circuitry 68 is further configured to prevent camping on a cell belonging to any other IAB node 16 served by the parent IAB node that sent the RLF indication. In some embodiments, the first IAB node 16, radio interface 62 and processing circuitry 68 is further configured to receive a broadcast system information block (SIB) from an IAB donor node 16 including cell barring information. In some embodiments, the first IAB node 16, radio interface 62 and processing circuitry 68 is further configured to send cell barring information to child IAB nodes 16 of the first IAB node 16.

According to another aspect, a method implemented in an IAB node 16 includes, responsive to receiving, via the radio interface 62, a radio link failure (RLF) indication from a parent IAB node 16, considering a cell from which the RLF indication is received as an unsuitable cell, and responsive to a cell being considered an unsuitable cell, cease to camp on the unsuitable cell.

According to this aspect, in some embodiments, further responsive to the cell being considered unsuitable, the method includes preventing, via processing circuitry 68, camping on a cell belonging to any other IAB node 16 served by the parent IAB node 16 that sent the RLF indication. In some embodiments, the method includes receiving, via the radio interface 62, a broadcast system information block (SIB) from an IAB donor node 16 including cell barring information. In some embodiments, the method includes sending, via the radio interface 62, cell barring information to child IAB nodes 16 of the first IAB node 16.

Further embodiments are described in the following:

Embodiment A1. A first integrated access and backhaul (IAB) node configured to communicate with at least a second IAB node, the first IAB node configured to, and/or comprising a radio interface and/or comprising processing circuitry configured to:
responsive to receiving a radio link failure (RLF) indication from a parent IAB node, consider a cell from which the RLF indication is received as an unsuitable cell; and
responsive to a cell being considered an unsuitable cell, cease to camp on the unsuitable cell.

Embodiment A2. The first IAB node of Embodiment A1, wherein further responsive to the cell being considered unsuitable, the first IAB node, radio interface and/or processing circuitry is further configured to prevent camping on a cell belonging to any other IAB node served by the parent IAB node that sent the RLF indication.

Embodiment A3. The first IAB node of Embodiment A1, wherein the first IAB node, radio interface and/or processing circuitry is further configured to receive a broadcast system information block (SIB) from an IAB donor node including cell barring information.

Embodiment A4. The first IAB node of Embodiment A1, wherein the first IAB node, radio interface and/or processing circuitry is further configured to send cell barring information to child IAB nodes of the first IAB node.

Embodiment B1. A method implemented in an integrated access and backhaul (IAB) node, the method comprising:
responsive to receiving a radio link failure (RLF) indication from a parent IAB node, considering a cell from which the RLF indication is received as an unsuitable cell; and
responsive to a cell being considered an unsuitable cell, cease to camp on the unsuitable cell.

Embodiment B2. The method of Embodiment B1, wherein, further responsive to the cell being considered unsuitable, prevent camping on a cell belonging to any other IAB node served by the parent IAB node that sent the RLF indication.

Embodiment B3. The method of Embodiment B1, further comprising receiving a broadcast system information block (SIB) from an IAB donor node including cell barring information.

Embodiment B4. The method of Embodiment B1, further comprising sending cell barring information to child IAB nodes of the first IAB node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first integrated access and backhaul (IAB) node that is configurable as a child IAB node to a second IAB node, the first IAB node comprising:
   processing circuitry configured to:
      receive, from the second IAB node, a backhaul adaptation protocol (BAP) control message that comprises:
         a radio link failure, RLF, indication indicating a RLF has been detected between the second IAB node and a parent IAB node to the second IAB node; and
         an indication of a plurality of cells that are at least temporarily unsuitable for camping for connection reestablishment due to the RLF, the plurality of cells comprising:
            cells provided by the second IAB node; and
            cells provided by a third IAB node that is a child IAB node to the second IAB node;
      responsive to the BAP control message, prevent the first IAB node from camping on any of the plurality of cells for connection reestablishment.

2. The first IAB node of claim 1, wherein the processing circuitry is further configured to:
   responsive to receiving the RLF indication from the second IAB node, determine at least one child IAB node to the second IAB node to be unsuitable for camping for connection reestablishment.

3. The first IAB node of claim 1, wherein the RLF indication is received in a backhaul adaptation protocol, BAP, control protocol data unit, PDU.

4. The first IAB node of claim 1, wherein the RLF indication includes cell identifiers of a plurality of IAB nodes, each respective cell identifier of the plurality of identifiers being one of:
   unsuitable for camping for connection reestablishment; and
   suitable for camping for connection reestablishment.

5. A parent integrated access and backhaul (IAB) node, comprising:
   processing circuitry configured to:
      detect that a radio link failure, RLF, has occurred between the parent IAB node and another IAB node; and
      transmit, to a first IAB node that is a child IAB node to the parent IAB node, a backhaul adaptation protocol (BAP) control message that comprises:
         a RLF indication indicating the detected RLF; and
         an indication of a plurality of cells that are at least temporarily unsuitable for camping for connection reestablishment due to the RLF, the plurality of cells comprising:
            cells provided by the parent IAB node; and
            cells provided by a third IAB node that is a child IAB node to the parent IAB node.

6. The parent IAB node of claim 5, wherein the RLF indication is transmitted in a backhaul adaptation protocol, BAP, control protocol data unit, PDU.

7. The parent IAB node of claim 5, wherein the RLF indication includes cell identifiers of a plurality of IAB nodes, each respective cell identifier of the plurality of identifiers being one of:
   unsuitable for camping for connection reestablishment; and
   suitable for camping for connection reestablishment.

8. The parent IAB node of claim 5, wherein the RLF indication indicates a predefined timer period for which the parent IAB node is unsuitable for camping for connection reestablishment.

9. A method for a first integrated access and backhaul (IAB) node, the first IAB node being configurable as a child IAB node to a second IAB node, the method comprising:
   receiving, from the second IAB node, a backhaul adaptation protocol (BAP) control message that comprises:
      a radio link failure, RLF, indication indicating a RLF has been detected between the second IAB node and a parent IAB node to the second IAB node; and an indication of a plurality of cells that are at least temporarily unsuitable for camping for connection reestablishment due to the RLF, the plurality of cells comprising:
cells provided by the second IAB node; and
cells provided by a third IAB node that is a child IAB node to is the second IAB node;
responsive to the BAP control message, prevent the first IAB node from camping on any of the plurality of cells for connection reestablishment.

10. The method of claim 9, further comprising, responsive to receiving the RLF indication from the second IAB node, determining at least one child IAB node to the second IAB node to be unsuitable for camping for connection reestablishment.

11. The method of claim 9, wherein the RLF indication is received in a backhaul adaptation protocol, BAP, control protocol data unit, PDU.

12. The method of claim 9, wherein the RLF indication includes cell identifiers of a plurality of IAB nodes, each respective cell identifier of the plurality of identifiers being one of:
unsuitable for camping for connection reestablishment; and
suitable for camping for connection reestablishment.

13. The method of claim 9, wherein at least the second IAB node is determined to be unsuitable for camping for a predefined time period.

14. The method of claim 9, further comprising:
responsive to receiving the RLF indication from the second IAB node, changing system information to indicate at least one cell associated with the first IAB node is unsuitable for camping for connection reestablishment; and
broadcasting the changed system information.

15. The method of claim 9, further comprising:
responsive to receiving the RLF indication from the second IAB node, broadcasting system information that indicates cells associated with the second IAB node are unsuitable for camping for connection reestablishment.

16. A method for parent integrated access and backhaul (IAB) node, the method comprising:
detecting that a radio link failure, RLF, has occurred between the parent IAB node and another IAB node; and
transmitting, to a first IAB node that is a child IAB node to the parent IAB node, a backhaul adaptation protocol (BAP) control message that comprises:
an RLF indication indicating the detected RLF; and
an indication of a plurality of cells that are at least temporarily unsuitable for camping for connection reestablishment due to the RLF, the plurality of cells comprising:
cells provided by the parent IAB node; and
cells provided by a third IAB node that is a child IAB node to the parent IAB node.

17. The method of claim 16, wherein the RLF indication is transmitted in a backhaul adaptation protocol, BAP, control protocol data unit, PDU.

18. The method of claim 16, wherein the RLF indication includes cell identifiers of a plurality of IAB nodes, each respective cell identifier of the plurality of identifiers being one of:
unsuitable for camping for connection reestablishment; and
suitable for camping for connection reestablishment.

19. The method of claim 16, wherein the RLF indication indicates a predefined timer period for which the parent IAB node is unsuitable for camping for connection reestablishment.

* * * * *